United States Patent Office 2,738,285
Patented Mar. 13, 1956

---

2,738,285

REINFORCED CEMENT PRODUCTS AND METHOD OF MAKING THE SAME

Lawrence P. Biefeld, Granville, and Frank O. Brisley, Newark, Ohio, assignors to Owens-Corning Fiberglas Corporation, Toledo, Ohio, a corporation of Delaware No Drawing. Application December 28, 1951,
Serial No. 263,998

8 Claims. (Cl. 106—99)

This invention relates to the manufacture of inorganic cementitious-glass fiber structures and it relates more particularly to an improvement in the processes described and claimed in the copending applications of Armstrong, Ser. No. 200,077, now Patent No. 2,664,406, filed on December 9, 1950, Biefeld, Armstrong and Shannon, Ser. No. 205,132, now Patent No. 2,717,841, filed on January 9, 1951, Biefeld and Shannon, Ser. No. 221,511, now Patent No. 2,712,512, filed on April 17, 1951, and Biefeld, Ser. No. 221,513, now abandoned, filed on April 17, 1951, and in other similar processes for combining glass fibers and inorganic cementitious compositions in the manufacture of glass fiber reinforced cement structures and the like.

In preparations wherein glass fibers are incorporated into the cementitious slurry, as by troweling, mixing or by other mechanical means, it has been found that, because of the high viscosity of the slurry or for other possible reasons, the glass fibers tend to curl up and form into balls with the result that distribution of glass fibers throughout the cementitious composition is poor and the glass fibers are unable in this condition to impart the characteristics for which they were incorporated. This tendency towards curling up and forming into balls appears to be somewhat proportional to the lengths of the fibers and the concentration of fibers in the cementitious composition and inversely proportional with the stiffness of the fiber as influenced by its thickness or the type of size or protective coating previously applied thereon.

Generally, the amount of glass fiber which can be incorporated in cement slurries of the type described ranges from 1 to about 18 percent by weight based upon the amount of cement. In some instances, such as where greater water dilution is employed to thin the slurry, glass fibers in concentrations higher than 18 percent are possible and as much as 60 percent glass fiber has been incorporated in cement slurries where the volume of the slurry is greatly increased, as by foaming in the manner described in the aforementioned application of Armstrong, Ser. No. 200,077. Whatever the concentration of glass, whether it be as low as 1 percent or as high as 10–20 percent or even 60 percent, balling up of the fibers occurs. If the fibers are of relatively short length, amounts up to about 5–6 percent by weight can be incorporated without difficulty when the fibers have been stiffened by application of a coating, such as a phenol formaldehyde resin or by the use of fibers having greater diameter, as will be referred to hereinafter.

It is an object of this invention to provide a method for incorporating glass fibers into slurries of cementitious material in a manner which permits rapid and uniform distribution and without forming the fibers into bundles, balls or the like and to produce composite structures embodying glass fibers uniformly distributed with cementitious binder.

Another object is to introduce an ingredient in the cementitious composition which prevents balling up of the glass fibers and without detracting from the structure and character of the final cementitious product.

The tendency for the glass fibers to ball up upon admixture with a cementitious slurry, whether it be formed of gypsum-urea, magnesium oxychloride cement or magnesium oxysulphate cement, alone or in combination with siliceous aggregate, plaster of Paris, Portland cement, or the like, may be overcome by the use of substantial amounts of asbestos fibers, preferably of short length, introduced with the glass fibers into the cementitious composition. The amount of asbestos may be varied over fairly wide limits depending upon the amount of glass fiber, the dimension and diameter of the glass fibers and the previous treatment which may have been applied thereto. With the presence of glass fibers ranging in amounts from 1–3 percent by weight of the cement, from 10–25 percent by weight asbestos shorts (smaller than 10–20 mesh) is sufficient to prevent balling and to aid rapid distribution under practically all circumstances. The amount of asbestos required increases in proportion to the increasing concentration of glass fiber but it is undesirable to make use of more than 50 percent by weight asbestos based upon the amount of cement.

More specifically, when glass fiber is present in concentrations of about 3 percent by weight, 10–15 percent by weight asbestos shorts will prevent balling up of glass fibers having a diameter of $55$–$75 \times 10^{-5}$ inches or less, no matter what previous treatment has been applied, and corresponding amounts of asbestos will be sufficient for use with glass fibers having a diameter of $35 \times 10^{-5}$ inches when treated with a resinous material that stiffens the fibers, such as with a phenol formaldehyde resin, butadiene-styrene copolymer resin, polyvinyl acetate, or an alkyd resin formed by the reaction of a polybasic acid with a polyhydric alcohol. When the glass fiber concentration is increased, it appears that the amount of asbestos shorts should also be increased substantially in the same proportion to prevent balling with a maximum concentration of about 50 percent. In order to prevent balling of untreated glass fibers having a diameter of $35 \times 10^{-5}$ inches or fibers of equivalent dimension treated with other size compositions incapable of imparting stiffness to the glass fibers, such as a melamine formaldehyde resin, urea formaldehyde resin, dextrinized starch binder or plasticized polyvinyl acetate, the amount of asbestos shorts for preventing balling of glass fibers when present in concentrations ranging from 1–4 percent by weight of the cement structure, may range up to 25 percent by weight of the cement composition with greater amounts in proportion to the increase of fiber, as previously pointed out, with a maximum of about 50 percent.

The mechanics of the reaction by which better and more rapid distribution of glass fibers is effected without substantial balling is not known. It is believed, however, that the fibrous structure which is characteristic of asbestos causes the glass fibers upon contact to become interlocked therewith whereby the glass fibers are held separate and apart from one another during the mixing action with the slurry. Whatever the reason, it is known that similar results are not available from the use of other substances in substitution for asbestos. Wallastinite, Gaspar, Novacite, potter's flint, glass wool fibers, glass wool sandings, diatomaceous earth, and a large number of other similar materials have been tried but without noticeable effect.

When asbestos is added in accordance with the practice of this invention, it is necessary also to add extra gauging water to compensate for the tremendous surface area which asbestos fibers introduce. It is estimated that about 1 percent more water is required for each percent of asbestos added. Although more than 50 percent by weight asbestos shorts might be introduced, the use of greater proportions thereof is undesirable because they and the extra gauging water required begin adversely to affect the character and the composition of the final product.

The following examples illustrate the practice of this invention:

Example 1

A slurry is formed of 1 part by weight of active magnesia, 2 parts by weight silex (95 percent through 200 mesh) and 3 parts by weight sand (20–30 mesh) mixed together and then gauged with a 22° Baumé magnesium chloride solution. Glass fibers having a diameter of about $35 \times 10^{-5}$ inches and sized with an alkyd resin are introduced in lengths of ½ to 1 inches cut from continuous strands and introduction is also made of asbestos shorts, the two materials being provided in amounts of 3 percent by weight glass fiber and 15 percent by weight asbestos shorts based upon the cement. The fibers may be mixed into the slurry to achieve rapid and uniform distribution with a trowel, or Hobart type mixer or other mixing apparatus with very few, if any, of the glass fibers balling up. The cementitious composition may be molded, cast or otherwise formed to desired shapes and allowed to set. Without the asbestos shorts, the glass fibers form into balls and cannot uniformly be distributed throughout the batch in a manner to supply the product formed thereof with the properties for which the glass fibers were introduced.

Example 2

A slurry is formed of about 70 parts by weight Portland cement and 30 parts by weight water. Three percent by weight glass fibers having a dimension of about $35 \times 10^{-5}$ inches in diameter and cut to lengths of about ½ to 1½ inches and sized with an alkyd resin are mixed therein with about 15 percent by weight asbestos shorts. About 1–3 parts water is added for each part by weight of glass fiber and asbestos in this and in the following examples to compensate for the large increase in surface area resulting from the addition of asbestos and glass fibers.

The fibers are mixed into the slurry with a trowel, by a paddle mixer or by a Hobart type mixer. The glass fibers maintain their separate identity and become distributed rapidly and uniformly throughout the slurry with little, if any, fibers forming into balls or otherwise segregated in non-uniform distribution in the slurry. The slurry may be formed into boards or poured into molds for curing at room condition or slightly elevated temperatures.

Example 3

When the amount of glass fiber in Example 2 is increased to 6 percent by weight of the cement composition, about 30 percent by weight of asbestos shorts (less than 10 mesh) should be added to achieve rapid and uniform distribution of the glass fibers and to prevent the glass fibers from gathering into separate bundles.

Example 4

When the diameter of the glass fibers of Example 2 is increased to about $55 \times 10^{-5}$ inches, about 15 percent by weight asbestos based upon the total solids will be sufficient to minimize balling of the glass fibers and assist their distribution in the cementitious composition.

Example 5

When the amount of glass fiber in Example 4 is increased to about 6 percent by weight, 20–30 percent by weight asbestos shorts should be added for the purpose of achieving rapid distribution of the glass fibers and to prevent balling thereof.

The same conditions prevail when instead of magnesium oxychloride and aggregate in the previous examples, the inorganic binder comprises gypsum, gypsum-urea formaldehyde resin, Portland cement, plaster of Paris, hydrous calcium silicate which is formed into a curved product by reaction in an autoclave with the described glass fiber and asbestos filler, and marketed at the present time without such fillers as a finished cement product under the trade name "Kaylo," or the like.

Example 6

When the glass fiber component of Example 2 is previously treated with a size compounded of dextrinized starch, hydrogenated oil and a saturated fatty acid amide instead of the alkyd resin, the amount of asbestos which is supplied to prevent balling should be about 25 percent by weight of the cement solids. When the amount of glass fiber of the type herein described is increased to 6 percent, as in Example 3, the amount of asbestos is increased to about 40–50 percent by weight.

Example 7

When the glass fiber component of Example 2 is instead sized with an unplasticized polyvinyl acetate, the amount of asbestos introduced to prevent balling should be about 15 percent by weight and when the polyvinyl acetate is highly plasticized to soften the coating and provide for greater flexibility in the fiber, about 20 percent by weight asbestos shorts should be used. Just about double the amount of asbestos should be used when glass fiber concentration herein is increased to about 6 percent, as in Example 3.

Example 8

When the amount of glass fiber in Example 2 is increased to 9 percent by weight, 45–50 percent by weight of asbestos shorts should be added to minimize balling and to assist in the rapid distribution of the glass fibers throughout the cementitious composition.

It will be apparent from this description that we have provided a method whereby glass fibers of reinforcing lengths, that is glass fibers having lengths ranging from ¼ to about 2 inches, may be introduced and uniformly and rapidly mixed into the slurry without the glass fibers having a tendency towards gathering into balls which prevent uniform distribution of glass fibers throughout the cementitious composition and permit the arrangement of glass fibers in the cementitious composition in a manner most suitable to impart the characteristics for which they were introduced.

It will be understood that changes may be made in the ratio of materials incorporated and their methods of combination without departing from the spirit of the invention, especially as defined in the following claims.

We claim:

1. In the method of fabricating products of inorganic hydraulic cement reinforced with glass fibers, the steps of mixing an aqueous medium with the inorganic hydraulic cement in amounts to form a viscous slurry, mixing glass fibers of reinforcing lengths of about ¼ to 2 inches into the slurry in amounts ranging from 1 to 18 per cent by weight of the inorganic hydraulic cement, mixing asbestos shorts with the slurry in advance of the glass fibers in amounts ranging from 10–50 per cent by weight of the inorganic hydraulic cement to prevent the formation of glass fiber balls and to assist in the distribution of the glass fibers throughout the slurry, the aqueous component of the slurry corresponding to the amount of water required for reaction to set the cement plus about 1 per cent of water for each per cent of asbestos present in the composition up to a maximum of about 50 per cent.

2. In the method of fabricating products of inorganic hydraulic cement reinforced with glass fibers, the steps of mixing an aqueous medium with the inorganic hydraulic cement in amounts to form a viscous slurry, mixing into the slurry from 1 to 3 per cent by weight of the cement of glass fibers of reinforcing lengths greater than ¼ inch and dimensioned to have a diameter less than $55–75 \times 10^{-5}$ inches, and mixing asbestos shorts into the slurry in advance of the glass fibers in amounts ranging from 10 to 25 per cent by weight of the inorganic hydraulic cement to prevent the formation of glass fiber balls and to aid in the distribution of the glass fibers throughout the cement slurry, the aqueous component of the slurry corresponding to the amount of water required for reaction to set the cement plus about 1 per cent of water for each per cent of asbestos present in the composition up to a maximum of about 50 per cent.

3. In the method of fabricating products of inorganic hydraulic cement reinforced with glass fibers, the steps of mixing an aqueous medium with the inorganic hydraulic cement in amounts to form a viscous slurry, mixing into the slurry from 3 to 10 per cent by weight of the inorganic hydraulic cement of glass fibers having a diameter of less than $55-75 \times 10^{-5}$ inches and a length of about ½ to 2 inches, and mixing asbestos shorts into the slurry in advance of the glass fibers in amounts ranging from 20 to 50 per cent by weight of the inorganic hydraulic cement to prevent balling and to aid in the distribution of the glass fibers in the cement slurry.

4. A glass fiber reinforced product of inorganic hydraulic cement consisting essentially of a matrix of a cured inorganic hydraulic cement, from 1–18 per cent by weight of glass fibers of reinforcing lengths ranging from ¼ to 2 inches uniformly distributed throughout the cement phase and substantially free of concentrations of glass fibers in the form of balls and an amount of asbestos ranging from 10–50 per cent by weight of the cement composition which function in the manufacture of the product to prevent balling and to assist in the distribution of the fibers in the cement slurry prior to cure and in which the concentration of asbestos is directly proportional to the concentration of the glass fibers within the ranges set forth.

5. An inorganic hydraulic cement product reinforced with glass fibers consisting essentially of a matrix of a cured inorganic hydraulic cement, 1 to 10 per cent by weight of glass fibers based upon the cement composition having a diameter within the range of $55-75 \times 10^{-5}$ inches and of reinforcing lengths ranging from about ¼ to 2 inches distributed uniformly throughout the cement phase and substantially free of glass fiber concentrations in the form of balls and asbestos shorts in amounts ranging from 10–50 per cent by weight of the cement composition which in combination with the glass fibers in the slurry function to prevent the formation of balls and assist in the distribution of glass fibers in the cement slurry prior to cure.

6. An inorganic hydraulic cement product reinforced with glass fibers consisting essentially of a matrix of a cured inorganic hydraulic cement, from 1 to 3 per cent by weight of glass fibers based upon the cement composition having a diameter less than $55-75 \times 10^{-5}$ inches and of reinforcing lengths greater than ¼ inch to about 2 inches distributed uniformly throughout the cement phase and substantially free of glass fiber concentrations in the form of balls, and from 10 to 25 per cent by weight of asbestos shorts based upon the weight of the cement composition, the amount varying in proportion to the amount and inversely in proportion to the stiffness of the glass fibers to prevent the formation of balls and to assist in distribution of the glass fibers in the slurry prior to cure.

7. An inorganic hydraulic cement product reinforced with glass fibers consisting essentially of a matrix of a cured inorganic hydraulic cement, from 3 to 10 per cent by weight of glass fibers based upon the weight of cement having a diameter less than $55 \times 10^{-5}$ inches and of reinforcing lengths ranging from ¼ to 2 inches distributed uniformly throughout the cement phase and substantially free of concentrations of glass fibers in the form of balls and from 20 to 50 per cent by weight of asbestos shorts based upon the weight of the cement composition, the amount varying in proportion to the amount and inversely in proportion to the stiffness of the glass fibers to prevent the formation of balls and to assist in the distribution of the glass fibers while in the slurry.

8. The product as claimed in claim 7 in which the asbestos shorts are limited to less than 10 mesh.

References Cited in the file of this patent

UNITED STATES PATENTS

| | | |
|---|---|---|
| 1,226,779 | Lappen | May 22, 1917 |
| 1,606,051 | Bartlett | Nov. 9, 1926 |
| 2,352,201 | Jacob | June 27, 1944 |
| 2,354,593 | Greider | July 25, 1944 |
| 2,383,604 | Leinstensnider et al. | Aug. 28, 1945 |
| 2,389,460 | Rinehart | Nov. 20, 1945 |
| 2,425,883 | Jackson | Aug. 19, 1947 |
| 2,428,654 | Collins | Oct. 7, 1947 |
| 2,509,599 | Hollenberg | May 30, 1950 |
| 2,526,066 | Croce | Oct. 17, 1950 |

FOREIGN PATENTS

| | | |
|---|---|---|
| 830,030 | France | May 2, 1938 |
| 70,937 | Austria | Jan. 10, 1916 |
| 654,367 | Great Britain | June 13, 1951 |

OTHER REFERENCES

Ser. No. 264,072, Ephraim et al. (A. P. C.), published May 11, 1943.